United States Patent [19]

Joh

[11] Patent Number: 5,621,893

[45] Date of Patent: Apr. 15, 1997

[54] SYSTEM FOR EXPANDING PORTS WHEREIN SEGMENT SWITCH SELECTIVELY ASSOCIATES PLURALITY OF HUBS COUPLED TO FIRST ARBITER AND PLURALITY OF HUBS COUPLED TO SECOND ARBITER

[75] Inventor: Clarence C. Joh, Allentown, Pa.

[73] Assignee: Lucent Technologies Inc., Murray Hill, N.J.

[21] Appl. No.: 343,290

[22] Filed: Nov. 22, 1994

[51] Int. Cl.⁶ .................................................. G06F 13/00
[52] U.S. Cl. ............................... 395/200.02; 395/200.2; 370/94.1; 370/85.13; 364/242.94; 364/242.6; 364/284.4
[58] Field of Search ........................ 370/60, 85.1, 85.6, 370/85.13, 94.1, 94.3; 395/200, 325, 200.02, 200.2; 364/222.2, 242.94, 242.95, 240, 284.3, 242.6, 284.4; 340/825.52

[56] References Cited

U.S. PATENT DOCUMENTS

| | | | |
|---|---|---|---|
| 3,633,169 | 1/1972 | Bickford | 395/200.01 |
| 4,513,373 | 4/1985 | Sheets | 395/200.18 |
| 4,536,877 | 8/1985 | Livingston et al. | 370/85.9 |
| 4,570,167 | 2/1986 | Sugitani et al. | 347/65 |
| 4,608,685 | 8/1986 | Jain et al. | 370/85 |
| 4,637,015 | 1/1987 | Bobey | 370/85.11 |
| 4,674,085 | 6/1987 | Aranguren et al. | 370/85.2 |
| 4,781,427 | 11/1988 | Husbands et al. | 350/96.16 |
| 4,787,082 | 11/1988 | Delaney et al. | 370/85.1 |
| 4,787,083 | 11/1988 | Tanaka | 370/85.1 |
| 4,792,970 | 12/1988 | Molnar | 379/284 |

(List continued on next page.)

OTHER PUBLICATIONS

Marks, Howard, Five Enterprise Switches, Lan Source, p. 144 Jul. 94.
MacAskill, Skip, SMC lets out a roar with Lan switch entry, Network World, p. 4 Sep. 94.
William Stallings, *Data and Computer Communication.* 1988 MacMillan Inc, ISBN 0-02-41551-2.
"Draft Standard—Information Technology Local and Metropolitan Networks—Part 12: Demand Priority Access Method and Physical Layer Specifications", Sponsor: Lan Man Standards Committee of the IEEE Computer Society, P802.12, Mar. 1994.
"Demand Priority Preliminary Draft", Submitted to IEEE 802.12, Jan. 1994.

*Primary Examiner*—Thomas C. Lee
*Assistant Examiner*—Anderson I. Chen

[57] ABSTRACT

An expandable local area hub network is provided by the present invention. The network comprises a plurality of hubs coupled along a memory bus. The network further includes a segment switch coupling the plurality of hubs to a first segment arbiter and a second segment arbiter to associate the plurality of hubs with the first segment arbiter and the second segment arbiter to form separate and distinct system units. In use, the first segment arbiter grants a hub controlling access to a first segment memory bus for transmission of a packet on the first segment memory bus based upon an internal protocol and the second segment arbiter grants a hub controlling access to a second segment memory bus for transmission of a packet on the second segment memory bus based upon an internal protocol.

18 Claims, 3 Drawing Sheets

U.S. PATENT DOCUMENTS

| | | | |
|---|---|---|---|
| 4,805,169 | 2/1989 | Van Asselt | 370/58.2 |
| 4,825,435 | 4/1989 | Amundsen et al. | 370/97 |
| 4,866,702 | 9/1989 | Shimizu et al. | 370/60 |
| 4,866,704 | 9/1989 | Bergman | 370/85.4 |
| 4,872,158 | 10/1989 | Richards | 370/58.1 |
| 4,885,740 | 12/1989 | Parson et al. | 370/60 |
| 4,905,230 | 2/1990 | Madge et al. | 370/85.6 |
| 4,922,503 | 5/1990 | Leone | 370/85.13 |
| 4,982,400 | 1/1991 | Ebersole | 370/85.15 |
| 4,998,247 | 3/1991 | Irvine-Halliday et al. | 370/94.1 |
| 5,014,269 | 5/1991 | Picandet | 370/85.11 |
| 5,018,139 | 5/1991 | Despres | 370/94.3 |
| 5,041,963 | 8/1991 | Ebersole et al. | 395/200.2 |
| 5,042,031 | 8/1991 | Yokoyama et al. | 370/85.5 |
| 5,043,938 | 8/1991 | Ebersole | 395/200.2 |
| 5,151,897 | 9/1992 | Suzuki | 370/85.13 |
| 5,177,737 | 1/1993 | Daudelin et al. | 370/67 |
| 5,237,567 | 8/1993 | Nay et al. | 370/85.1 |
| 5,239,673 | 8/1993 | Natarajan | 455/33.1 |
| 5,317,565 | 5/1994 | Crouse et al. | 370/58.2 |
| 5,319,644 | 6/1994 | Liang | 370/85.5 |
| 5,345,447 | 9/1994 | Noel | 370/67 |
| 5,351,241 | 9/1994 | Yehonatan | 370/85.3 |
| 5,353,412 | 10/1994 | Douglas et al. | 395/325 |
| 5,355,124 | 10/1994 | Kochem | 340/825.05 |
| 5,432,907 | 7/1995 | Picazo, Jr. et al. | 395/200 |
| 5,467,351 | 11/1995 | Baumert | 370/85.15 |
| 5,469,438 | 11/1995 | Baumert et al. | 370/85.11 |

SYSTEM FOR EXPANDING PORTS WHEREIN SEGMENT SWITCH SELECTIVELY ASSOCIATES PLURALITY OF HUBS COUPLED TO FIRST ARBITER AND PLURALITY OF HUBS COUPLED TO SECOND ARBITER

FIELD OF THE INVENTION

The present invention relates to local area networks and, more particularly, to an extendable, round robin, local area hub network, such as may be employed, for example, in computer communications.

BACKGROUND OF THE INVENTION

With the recent expansion in the use of computers and computer terminals it is not unusual to have a large number of computers and terminals within a limited local area. It is very desirable to couple these units together to allow sharing of resources and permit a single terminal to access a plurality of other computers or terminals. One way of accomplishing this is the local area network (LAN). A local area network provides switching and data distribution for the transmission of information and allows computers to communicate with each other. LAN's further allow any single terminal to have access to a multiplicity of computers and peripheral equipment.

Local Area Networks, such as are used, for example, in computer communications, are well known and described in U.S. Pat. No. 5,041,963, entitled, "Local Area Network with an Active Star Topology Comprising Ring Controllers having Ring Monitor Logic Function", by Ebersole et al., issued Aug. 20, 1991; U.S. Pat. No. 4,998,247, entitled, "Active Star-Configured Local Area Network", by Irvine-Halliday et al., issued Mar. 5, 1991; U.S. Pat. No. 4,982,400 entitled, "Ring Bus Hub for a Star Local Area Network", by Ebersole, issued Jan. 1, 1991; U.S. Pat. No. 4,825,435, entitled "Multiport Repeater", by Amundsen et al., issued Apr. 25, 1989; U.S. Pat. No. 4,872,158, entitled, "Distributed Control Rapid Connection Circuit Switch", by Richards, issued Oct. 3, 1989; U.S. Pat. No. 4,787,082, entitled, "Dataflow Control Arrangement for Local Area Network", by Delaney et al., issued Nov. 22, 1988; U.S. Pat. No. 4, 674,085, entitled, "Local Area Network", by Aranguren et al., issued Jun. 16, 1987; all of the foregoing being incorporated by reference.

The stations or nodes of a local area network may be configured in a variety of shapes, such as, for example, as a ring or a star. In a star-configured or local area hub network, multiple, discrete, remote stations are coupled through a central site or station, termed a hub station. The hub station follows a particular or predetermined signaling protocol to establish communications and to determine the order in which remote stations are permitted to transmit data over the network in the form of signals, such as electrical or optical signals. In one such signaling protocol, termed round robin, each of the remote stations is separately polled for transmissions. Likewise, in a round robin signaling protocol, only one station may transmit electrical signal data over the network at a time; that is, only one station may have controlling access to transmit a packet on a memory bus.

According to a ring network topology, transmission is from node to node around a closed loop and each node may alter the data passing therethrough. Each data processing device is connected to a separate node and intercepts only data messages specifically directed to a node. Since the data flows through each node and since the nodes are distributed, no central node may be separately secured and hence, the security and privacy of a ring network topology is somewhat less than that of the star network topology. Additionally, all nodes are in one closed loop and, failure of a single node may render the whole ring network inoperative. The closed loop topology also limits flexibility in some arrangements where adding new nodes or data processing stations results in the loss of data.

As with the star topology discussed above, hubs in a ring topology must follow a particular or predetermined signaling protocol to establish communications and to determine the order in which remote stations are permitted to transmit data over the network in the form of signals. The round robin signaling protocol discussed above is one such protocol and is applicable to a ring topology in the same manner it applies to a star topology.

Data transmission in a bus network topology is typically broadcast from one source to all other devices on the same bus, but is normally only accepted by the device to which it is specifically addressed. Individual data processing devices are programmed to recognize data messages addressed to or intended for them as they pass them by on the bus. The reliability of the bus network topology, in terms of network node failure, is greater than that of the ring network topology, although a break in the bus may be catastrophic. There is also greater flexibility in adding new data processing devices to the system than is normally possible with the star topology since no wiring reconfiguration is required. Although a round robin protocol is generally not applicable to a bus topology, it might be applicable if one hub is designated as the controlling hub. If this were the case, the controlling hub would be programmed with logic to govern the remaining hubs in accordance with the round robin protocol.

As disclosed and described in *Draft for Standard Information Technology Local and Metropolitan Networks—Part 12—Demand Priority Access Method and Physical Layer Specification,* P802.12, dated March 1994, herein incorporated by reference, a round robin protocol has been proposed to the IEEE to be employed in the local area networks transmitting data in the form of electrical signals 100 megabits per second, termed 100 Base VG. A round robin protocol provides advantages over other known network protocols, such as the protocol employed by the IEEE standard 802.3, also known as CSMA/CD (Carrier Sense Multiple Access with Collision Detection). The advantages associated with the round robin protocol are especially applicable for time sensitive multimedia communication tasks. Specifically, in multimedia applications it becomes desirable to prioritize or control access to the media or communication networks provided to different remote stations. The prioritized or controlled access permits more important communications tasks to obtain access to the network earlier than the less important tasks.

Several different media can be used to carry local area network communications. Considerations regarding network topology, maximum distance between nodes, volume of information to be transmitted, and speed of transmission are critical in selecting a particular communications medium. Physical limitations such as plenum, conduit sizes, and routing plans in the building also affect the choice of the medium. Finally, for some network topologies, user accessibility to the bus for passive tapping is also extremely important.

Figure 1:
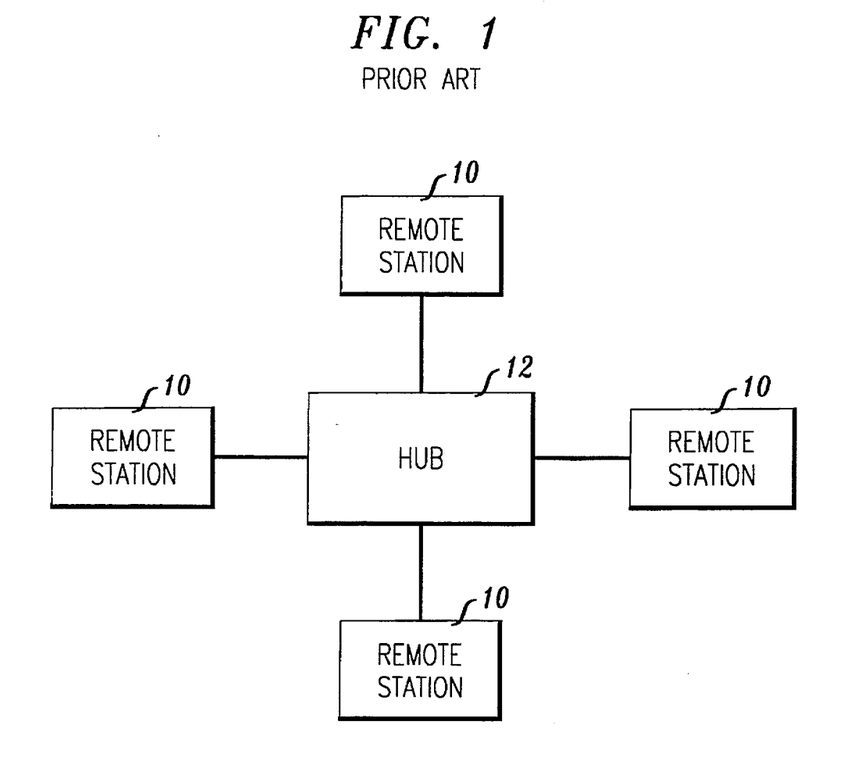
FIG. 1 is a schematic representation of a central hub coupled to a series of remote stations.

FIG. 1 is a schematic diagram of one embodiment of a conventional local area star-configured or hub shaped network. As previously suggested, in a local area hub network, the remote stations 10 may be arranged in a star-shaped network, or in a star configuration, in which a central station acts as a hub 12 for the remote stations 10. Thus, a hub or hub station may be used to transmit a signal packet, such as an electrical signal packet, from one remote station to another remote station, or multiple remote stations, since all of the remote stations are in direct communications with, or directly coupled to, the hub. Remote stations may comprise, for example, a data terminal or other computer-related equipment, as described in the aforementioned *Demand Priority Access* document.

Figure 2:
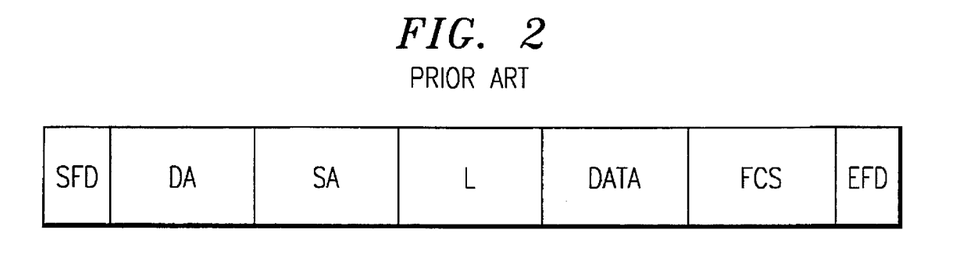
FIG. 2 is a schematic representation of a packet.

In the context of the invention, the term "packet" refers to a complete and discrete grouping of data in the form of signals, typically digital signals, for transmission between stations. Thus, for example, a packet may comprise digital signals to be transmitted. Typically, packets include a start of frame delimiter (SFD), and an end of frame delimiter (EFD). Likewise, as described on page 4-3 of the aforesaid *Demand Priority Access* document, and as illustrated in FIG. 2, a packet may further include binary digital signals, or bits, representing, for example, a destination address (DA), a source address (SA), the length of the packet (L), the data to be transmitted (DATA), and a frame check sequence (FCS) for signal error checking.

In the network illustrated in FIG. 1, packets, such as electrical signal packets, transmitted between two remote stations must pass through the hub. Depending on the particular network, the hubs typically have the capability to perform and recognize a signaling protocol (often termed "handshaking"), the capability to identify and extract data from an electrical signal packet, the capability to store data in the form of electrical signals, the capability to perform signal error checking, and the capability to perform destination address matching, such as described in the aforementioned *Demand Priority Access* document.

For a local area hub network, it often becomes desirable to increase the size of the network without substantially degrading signal transmission performance; that is, it is desirable for the network to be extendible. However, as local area hub networks increase in size, the hardware for communications between remote stations of the network becomes increasingly complex. For example, technological limitations on the manufacture of integrated circuit chips typically restrict the number of ports that may be fabricated on one chip. Specifically, in any integrated chip implementation of a multiple-port LAN hub the number of user ports is usually limited to between six and twelve per single hub integrated chip due to physical limitation. Thus, for a large local area hub network having, for example, tens or hundreds of stations, communications between the remote stations directly linked or coupled to one hub station in the network may need to be shared among several, discrete devices or chips. Additionally, since all the network traffic must go through a specific hub, the bandwidth available to each port decreases as more ports are added to the hub. Further, the problem of performing or controlling round robin polling between these discrete devices also becomes more complex.

One way to overcome the limited number of ports available on a signal hub is the coupling of hubs to form a local area hub network consisting of multiple hubs. For such a local area hub network, the hubs should be coupled and signals must be communicated between the hubs so that the performance of the round robin signaling protocol is not substantially degraded. Furthermore, it is desirable not to increase the complexity of the hardware unduly and to exhibit low pin or port overhead by reducing the number or maintaining a relatively low number of ports needed to accomplish satisfactory operation.

In view of the foregoing discussion a need exists for an extendable local area hub network which efficiently, reliably and functionally increases the number of ports available on a local area hub network. The present invention provides such a network.

SUMMARY OF THE INVENTION

An expandable local area hub network is provided by the present invention. The network comprises a plurality of hubs coupled along a common memory bus. The network further includes a segment switch coupling the plurality of hubs to a first segment arbiter and a second segment arbiter to selectively associate the plurality of said hubs with the first segment arbiter and the second segment arbiter to form separate and distinct system units. In use, the first segment arbiter grants a hub controlling access to a first segment memory bus for transmission of a packet on the first segment memory bus based upon an internal protocol and the second segment arbiter grants a hub controlling access to the second segment memory bus for transmission of a packet on the second segment memory bus based upon an internal protocol.

Other objects, advantages and salient features of the invention will become apparent from the following detailed description, which taken in conjunction with the annexed drawings, discloses the preferred embodiment of the present invention.

DETAILED DESCRIPTION OF THE PREFERRED EMBODIMENT

The present invention provides an efficient and elegant method for expanding the number of available ports in a local area hub network operating under the 100Base VG round robin protocol disclosed in the aforementioned *Demand Priority Access* document.

Figure 3:
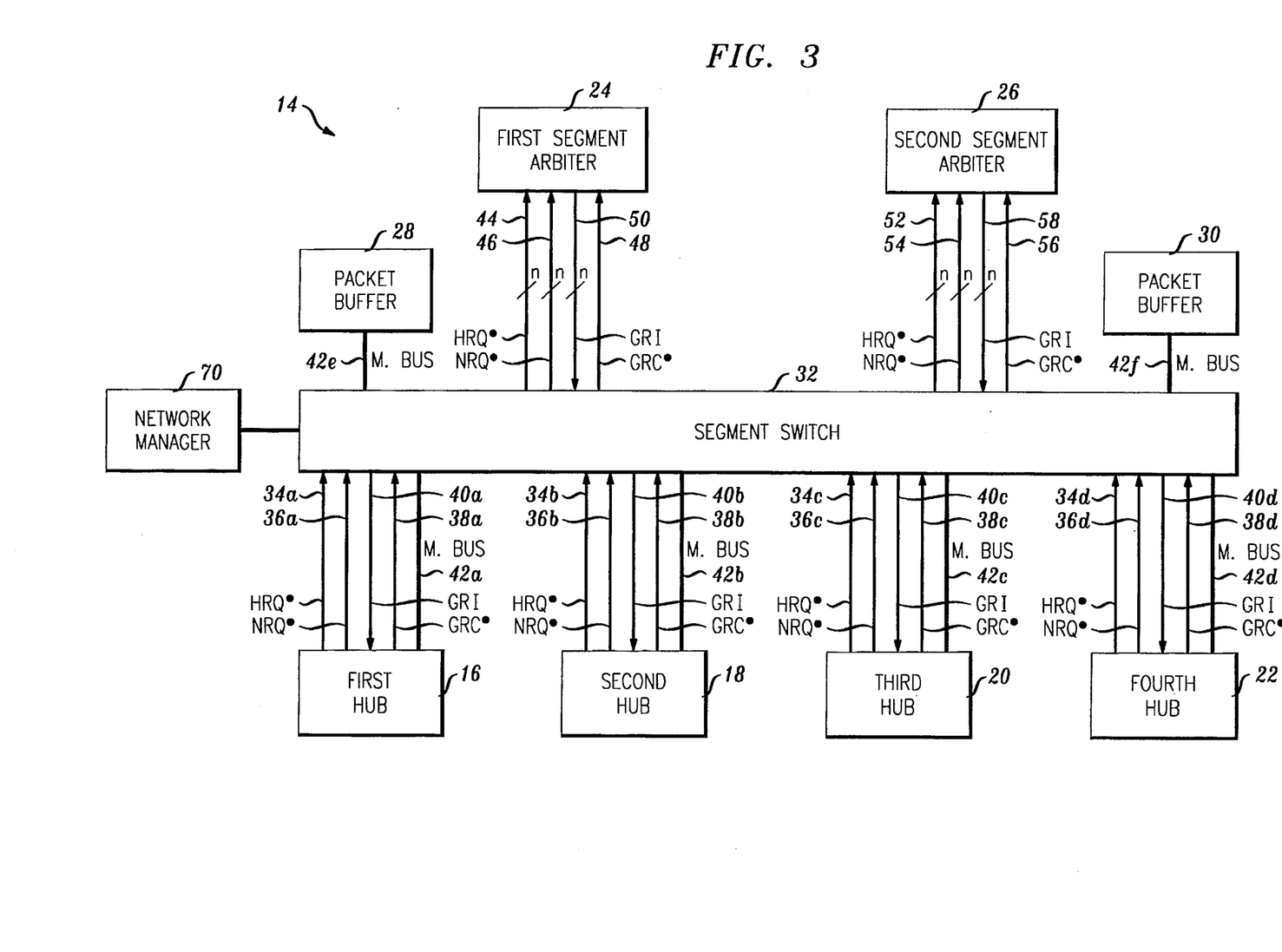
FIG. 3 is a schematic representation of a of the present invention.

With reference to FIG. 3 a local area hub network is disclosed. Generally, the network provides a series of hubs communicating with a predetermined number of arbiters through a segment switch. My concurrently filed patent application entitled, "Port Expansion Network And Method for 100Base VG-protocol LAN Hubs", Attorney Docket No. C.C. Job 4, discloses the use of arbiters in an expanded local area hub network and is incorporated herein.

The segment switch divides the network into a plurality of distinct system units by selectively associating the hubs with predetermined arbiters in a manner that will be discussed below in greater detail. Once the hubs are associated with specific arbiters, the distinct system units do not interact. Although hubs generally continue to be associated with a specific arbiter and packet buffer, association of the hubs with the arbiters and packet buffers can be varied by a network manager 70 if circumstances dictate. The segment switch includes logic circuitry permitting the development of distinct system units, in a manner similar to those found on the Ethernet.

Specifically, FIG. 3 discloses a network 14 including 4 hubs, first hub 16, second hub 18, third hub 20, and fourth hub 22, coupled to a first segment arbiter 24, a second segment arbiter 26, a first packet buffer 28 and a second packet buffer 30 through a segment switch 32. While the embodiment shown in FIG. 3 utilizes 4 hubs, greater or fewer hubs may be incorporated depending upon the particular application and embodiment, without departing from the spirit of the present invention.

The hubs are preferably, 100Base VG-protocol LAN hubs, and more particularly, 100Base VG Hub chip. As shown in FIG. 3, each hub includes 6 ports, although additional ports are possible without departing from the spirit of the invention, if the hub is physically able to accommodate the additional hubs.

The segment switch 32 divides the network into distinct system units by selectively associating the hubs with one of the arbiters and packet buffers. In the disclosed embodiment, the segment switch 32 has the ability to divide the network 14 into two distinct independently operating system units; each system unit including a separate arbiter, common packet buffer, memory bus, and associated communication lines (for example, High Priority Grant Request (HRQ) lines, Normal Priority Grant Request (NRQ) lines, Grant In (GRI) lines, and Grant Captured (GRC) lines).

The memory bus permits communication between hubs associated within a system unit, while the common packet buffer is capable of storing packet information transmitted on the memory bus. The arbiters function within their distinct system units to grant the hubs controlling access to the memory bus for the transmission of packets (that is, designate the temporary bus master hub) in a manner that will be discussed in more detail. Controlling access is granted in accordance with the round robin protocol set forth in the aforementioned *Demand Priority Access* document.

As stated above, the arbiter controls the designation of the temporary bus master hub. In response to Grant Requests (HRQ and NRQ), the arbiter designates the temporary bus master hub in accordance with round robin protocol by transmitting a Grant In (GRI) signal to the appropriate hub via GRI lines coupled between each hub and the arbiter. Transmission of the GRI signal provides the hub with controlling access to the memory bus. Specifically, a hub is granted controlling access to the memory bus when the arbiter transmits the Grant In (GRI) signal to a hub and that hub has the GRI signal captured. Only when a hub has controlling access to the memory bus is the hub permitted to transmit a packet on the memory bus.

Additionally, each of the hubs within a system unit, as well as the associated arbiter, are coupled to a Grant Captured (GRC) line through the internal circuitry of the segment switch 32. Each hub has continuous access to the GRC line to signal other hubs that a specific hub has been granted controlling access to the memory bus, that is, the temporary bus master hub. The hubs also monitor the GRC line to determine whether other hubs have been granted controlling access.

Grant Requests, High Priority Requests (HRQ) and Normal Priority Requests (NRQ), for controlling access to the memory bus to transmit a packet are made by the hubs via HRQ lines and NRQ lines, respectively, in a manner that will be discussed in more detail below. Although only the use of two priority levels are disclosed, a wide variety of priority levels could be implemented without departing from the spirit of the present invention.

Within a system unit as defined by the segment switch 32, each of the hubs receives requests from their respective remote stations. When the requests are received, the respective hub decodes the packet transmitted by the remote station, descrambles the packet and makes a request for controlling access to the memory bus based upon the priority information found in the packet. Specifically, either an HRQ or a NRQ is transmitted to the arbiter via the HRQ or NRQ line, respectively.

When the arbiter receives Grant Requests (HRQ or NRQ) from the hubs with their pending requests from their respective ports (i.e, remote stations), the arbiter makes a determination and issues a Grant In (GRI) signal to one of the hubs according to its internal round robin protocol. However, the GRI signal is issued only when the Grant Capture (GRC) signal is idle, that is, when no hub has transmitted a GRC signal on the GRC line. When the arbiter transmits a GRI signal to a hub, that hub transmits a GRC signal to the common GRC line and becomes the temporary bus master hub.

At this point, the temporary bus master hub simultaneously dispatches the packet to the address matching unit and the common memory buffer in bytes. The temporary bus master hub's address matching unit then reviews the destination address of the hub to determined whether the packet is being directed to another remote station coupled to the temporary bus master hub. With regard to the transmission of the packet to the common packet buffer, each of the hubs coupled to the common memory bus will decode the destination address of the packet, determine whether the packet is intended for one of the remote stations coupled to their ports and capture the packet if the packet is intended for one of their remote stations.

If the packet is unicast and destined for another port of the temporary bus master hub, the broadcast of the packet to the memory bus is a wasted motion, although no harm is done. Specifically, the temporary bus master hub, after realizing that the packet is destined for one of its own ports, retrieves the packet from the memory bus and transmits it to the intended port and remote station.

If the packet is unicast and destined to one of the other hubs coupled to the memory bus, the destination hub will identify the destination address through its address matching unit and capture the packet (even though it is not the temporary bus master hub). In contrast to the previous situation where the packet was destined for another port of the temporary bus master hub, the temporary bus master (and originating) hub does not transmit the packet to one of its own output ports.

If, on the other hand, the packet is multicast or broadcast, the temporary bus master hub immediately transmits the packet to the common packet buffer via the memory bus. While the dispatched packet is on the memory bus, each of the hubs decodes the destination address of the packet, and determines whether the packet is intended for one of the remote stations coupled to their ports. All interested hubs, including the temporary bus master hub, will then capture the dispatched packet and transmit the packet to the appropriate remote stations.

Once the temporary bus master hub has transmitted the requested packet for which its was granted controlling access to the memory bus, the temporary bus master hub notifies the central expansion arbiter and releases its mastership by releasing the GRC line. Release of the GRC line is accomplished by withdrawing the previous GRC signal sent by the temporary bus master hub. The arbiter then passes the GRI signal to another hub depending upon its internal round robin protocol. Specifically, each hub is granted controlling access to the memory bus, that is, designated the temporary bus master hub, for the purpose of transmitting a single packet based upon a single request from one of the hub's ports. In this way the arbiter has complete control over the order in which requests are accommodated and packets are transmitted over the memory bus.

For example, if the temporary bus master hub has been granted the mastership with a Normal Priority Grant Request, and if the arbiter identifies a High Priority Request from another hub, the arbiter will move the HRQ ahead of all the pending NRQs. The arbiter then takes the GRI signal from the temporary bus master hub by notifying the temporary bus master hub that it should release the bus mastership. The temporary bus master hub then completes its current packet transmission and releases the mastership. This is accomplished by releasing the GRC line. The arbiter then grants the hub making the HRQ controlling access to the memory bus and designates the hub as the temporary bus master hub.

Similarly, if the temporary bus master hub (which has been given the mastership for NRQ's) identifies an HRQ from one of its own ports, the temporary bus master hub will notify the central expansion arbiter through the HRQ line. The central arbiter will then record the HRQ in one of its internal registers for bookkeeping purposes, but will not otherwise change anything. The sequence of controlling access will then following the round robin protocol in the manner discussed above.

In accordance with the requirements of the system discussed above, each of the hubs is coupled to the segment switch 32 for the transmission of high priority Grant Requests (HRQ) and normal priority Grant Requests (NRQ) via respective HRQ lines 34a, 34b, 34c, 34d and NRQ lines 36a, 36b, 36c, 36d. Each hub is further coupled to the segment switch 32 by respective Grant Capture (GRC) lines 38a, 38b, 38c, 38d so that the hubs are able to transmit a GRC signal, while the arbiter and other hubs are able to monitor which hub has controlling access to the memory bus for the transmission of packets. Additionally, each hub is coupled to the segment switch 32 by a Grant In (GRI) line 40a, 40b, 40c, 40d so that the arbiter transmit GRI signals to the appropriate hub. Further, each hub is coupled to the segment switch 32 by a memory bus 42a, 42b, 42c, 42d, while the first segment packet buffer 28 and the second segment packet buffer 30 are also coupled to the segment switch 32 by respective memory buses 42e, 42f. As will be discussed in greater detail below, the memory bus is common within each system unit created by the segment switch 32.

Similarly, the segment switch 32 is coupled to the first segment arbiter 24 and the second segment arbiter 26. As with the connection between the hubs and the segment switch 32, the connection between the segment switch 32 and the arbiters permits the transmission of information. Specifically, first segment arbiter 24 is coupled to the segment switch by HRQ lines 44, NRQ lines 46, GRC line 48 and GRI lines 50 for the transmission of respective signals between its associated hubs, while second segment arbiter 26 is coupled to the segment switch 32 by HRQ lines 52, NRQ lines 54, GRC line 56 and GRI lines 58 for the transmission of respective signals between its associated hubs. The number of HRQ, NRQ and GRI lines is determined by the number of hubs associated with each arbiter and is designated by "n" in FIG. 3. For example, if three hubs are intended to be associated with first segment arbiter 24, three HRQ lines 44 would be provided between the segment switch 32 and the first segment arbiter 24, three NRQ lines 46 would be provided between the segment switch 32 and the first segment arbiter 24, and three GRI lines 50 would be provided between the segment switch 32 and the first segment arbiter 24. Only one GRC line is necessary since this line is common amongst the associated hubs and arbiter to permit monitoring of grant status of the memory bus.

As stated above, the segment switch 32 creates distinct system units for associating hubs with predetermined arbiters. For example, with reference to FIG. 4, the first hub 16 and the second hub 18 could be associated with the first segment arbiter 24 (with HRQ, NRQ, GRI and GRC lines appropriately coupled) and the first segment packet buffer 28, while the third hub 20 and the fourth hub 22 could be associated with the second segment arbiter 26 (with HRQ, NRQ, GRI and GRC lines appropriately coupled) and the second segment packet buffer 30. Two distinct memory buses are also created by the segment switch 32, with the first segment packet buffer 28, the first hub 16 and the second hub 18 associated with a first memory bus unit 60, and the second segment packet buffer 30, the third hub 20 and the fourth hub 22 associated with a second memory bus unit 62. In this case, the first segment system unit 66 would function separately and distinctly from the second segment system unit 68. Each segment system unit functions in the manner set forth above with the arbiter determining the order which the hubs will have controlling access to the memory bus.

Figure 4:
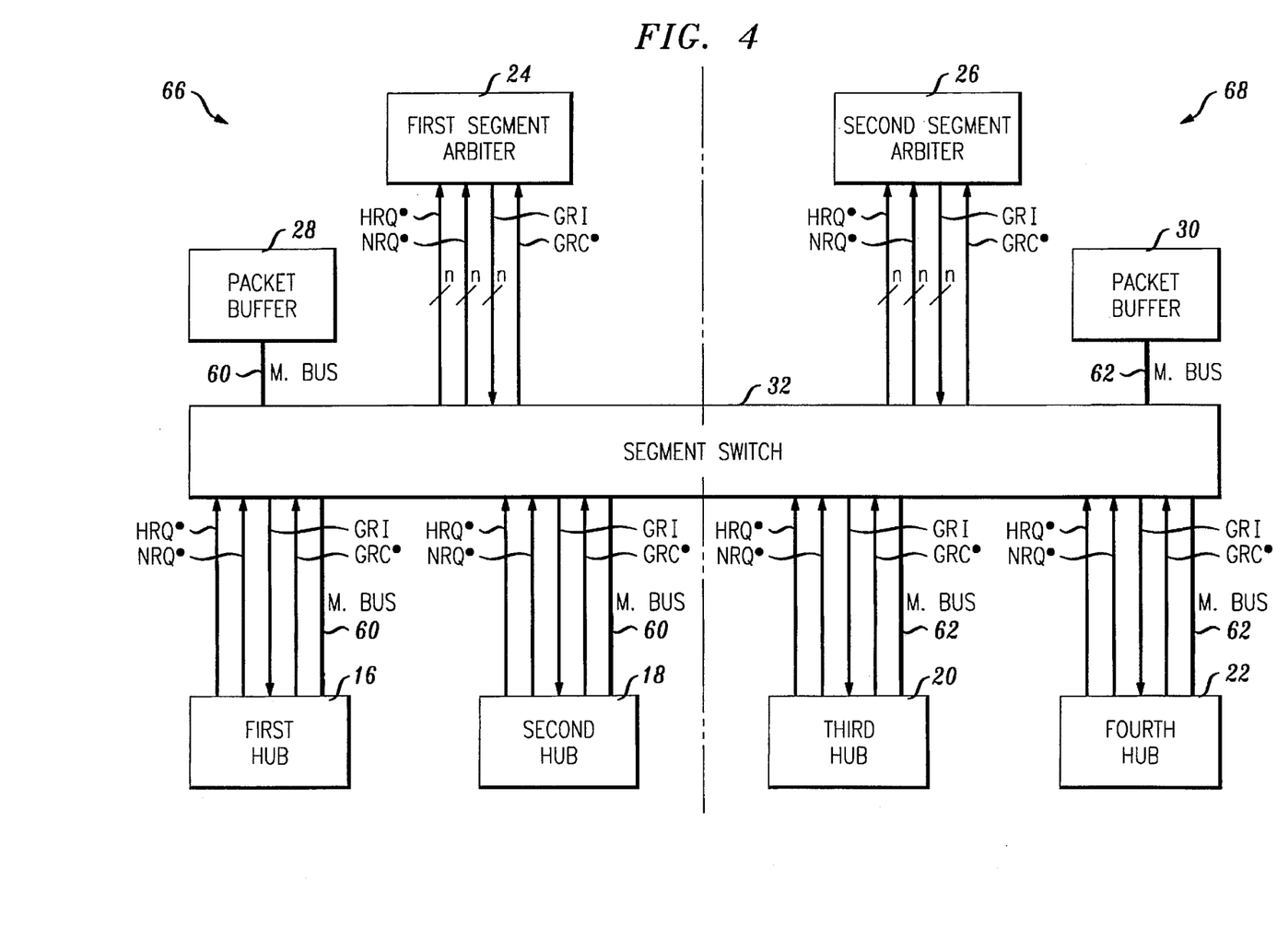
FIG. 4 is a schematic representation of one application of the present invention.

Although a symmetrical association of hubs is discussed above, the hubs may be associated in any manner the network manager 70 believes will be most advantageous. For example, three hubs could be associated with the first segment arbiter 24 and one hub could be associated with the second segment arbiter 26. Similarly, in critical applications all of the hubs could be associated with the first segment arbiter 24. The hubs would have no association with the second segment arbiter 26, unless the first segment packet buffer 28, the first segment arbiter 24, or some other feature of the first segment system unit 66 failed. If a failure did occur, the network manager 70 would alter the segment switch 32 so that all of the hubs were associated with the second segment arbiter 26, and the failure in first segment system unit 66 would not have affected the critical mission.

In use, the network functions in the following manner. Assuming the first hub 16 and second hub 18 are associated with the first segment arbiter 24 and make a variety of Normal Priority Grant Requests, the first segment arbiter 24 designates the temporary bus master hub in accordance with round robin protocol. As a result, the Grant In signal will be successively transmitted to each hub as the protocol dictates. This will continue until a High Priority Grant Request is received by the first segment arbiter 24.

Assume the first hub 16 is the temporary bus master hub when the second hub 18 makes a HRQ. At this point, the first segment arbiter 24 will move the HRQ ahead of all the pending NRQs. The first segment arbiter 24 will then take the GRI signal from the first hub 16 by notifying the first hub 16 that it should release the bus mastership. The first hub 16 then completes its current packet transmission and releases the mastership. This is accomplished by releasing the GRC line. The first segment arbiter 24 then grants the second hub 18 controlling access to the memory bus 60 and designates the second hub 18 as the temporary bus master hub. The second hub 18 would then send a GRC signal over the GRC line. If the HRQ had come from the first hub 16 while the first hub 16 was the temporary bus master hub, the first segment arbiter 24 would have followed the same procedure set forth above, with the exception of granting the GRI back to the first hub 16 after it released the GRC line.

By providing a segment switch between the hubs and the arbiters (with at least one arbiter per segment) and a common packet buffer per segment, a bandwidth-multiplying multi-segment switching system can be built.

Further, the modular nature of the present system permits unlimited expansion, which could result in one large local hub with an almost unlimited number of available ports. Although the disclosed embodiments only disclose coupling a system with four hubs and two arbiters, any number of hubs and arbiters could be coordinated without departing from the spirit of the present invention.

As stated previously, the hubs may be implemented by integrated circuit chips, although the invention is not restricted in scope in this particular manner. Integrated circuit chips offer the convenience of a relatively small size device at a relatively moderate cost. As previously suggested, more than one hub is employed in those situations that require communication among a relatively large number of remote stations for a single hub station due to limitations on the number of ports for a single integrated circuit chip. Nonetheless, alternatively, these local area hub network components may be implemented with alternative technologies other than integrated circuitry, such as, for example, discrete electrical circuit components or logic gates. Furthermore, hubs need not be restricted to implementation on a single integrated circuit chip. The invention is also not restricted in terms of the type of couplings employed to manually connect or couple the hubs and other components; however, typical interconnection such as, for example, electrical conductive wires, optical fibers, or coaxial cable connections are employed.

While the preferred embodiment of the present invention has been shown and described, it will be understood that it is intended to cover all modifications and alternate methods falling within the spirit and scope of the invention as defined in the appended claims or their equivalents.

What is claimed is:

1. A method for expanding the number of ports available to a local area hub network including a plurality of hubs coupled along a common memory bus, wherein said hubs must be granted controlling access to said memory bus before transmitting packets on the memory bus, comprising the steps of:

providing a plurality of hubs;

providing a first segment arbiter means for granting a hub controlling access to a first segment memory bus for transmission of a packet on said first segment memory bus based upon an internal protocol;

providing a second segment arbiter means for granting a hub controlling access to a second segment memory bus for transmission of a packet on said second segment memory bus based upon an internal protocol;

coupling said plurality of hubs to said first segment arbiter means and said second segment arbiter means via a segment switch, wherein said segment switch selectively associates said plurality of said hubs with said first segment arbiter means and said second segment arbiter means to form separate and distinct system units.

2. The method according to claim 1, wherein said first segment arbiter means grants controlling access for transmission of a single packet and said second segment arbiter means grants controlling access for transmission of a single packet.

3. The method according to claim 1, wherein said first segment arbiter means grants controlling access to said plurality of hubs based upon requests made by said plurality of hubs and said second segment arbiter means grants controlling access to said plurality of hubs based upon requests made by said plurality of hubs.

4. The method according to claim 1, further including the step of coupling a first segment packet buffer and a second segment packet buffer to said segment switch permitting said segment switch to selectively associate said plurality of said hubs with said first segment packet buffer and said second segment packet buffer.

5. The method according to claim 1, wherein said segment switch associates all of said plurality of hubs with said first segment arbiter means.

6. The method according to claim 1, wherein said segment switch associates half of said plurality of hubs with said first segment arbiter means and half of said plurality of hubs with said second arbiter means.

7. A local area hub network having an expandable number of ports, comprising:

a plurality of hubs coupled along a memory bus, each hub including a plurality of ports for interfacing with remote stations;

a first segment arbiter means for granting a hub controlling access to a first segment memory bus for transmission of a packet on said first segment memory bus based upon an internal protocol;

a second segment arbiter means for granting a hub controlling access to a second segment memory bus for transmission of a packet on said second segment memory bus based upon an internal protocol;

a segment switch means for coupling said plurality of hubs to said first segment arbiter means and said second segment arbiter means, wherein said segment switch selectively associates said plurality of said hubs with said first segment arbiter means and said second segment arbiter means to form separate and distinct system units.

8. The network according to claim 7, wherein said first segment arbiter means grants controlling access for transmission of a single packet and said second segment arbiter means grants controlling access for transmission of a single packet.

9. The network according to claim 7, wherein said first segment arbiter means grants controlling access to said plurality of hubs based upon requests made by said plurality of hubs and said second segment arbiter means grants controlling access to said plurality of hubs based upon requests made by said plurality of hubs.

10. The network according to claim 7, further including a first segment packet buffer and a second segment packet buffer coupled to said segment switch means for permitting said segment switch to selectively associate said plurality of hubs with said first segment packet buffer and said second segment packet buffer.

11. The network according to claim 7, wherein said segment switch means associates all of said plurality of hubs with said first segment arbiter means.

12. The network according to claim 7, wherein said segment switch means associates half of said plurality of hubs with said first segment arbiter means and half of said plurality of hubs with said second arbiter means.

13. A local area hub network having an expandable number of ports, comprising:

a plurality of hubs coupled along a memory bus, each hub including a plurality of ports for interfacing with remote stations;

a segment switch coupling said plurality of hubs to a first segment arbiter and a second segment arbiter to selectively associate said plurality of said hubs with said first segment arbiter and said second segment arbiter to form separate and distinct system units;

wherein said first segment arbiter grants a hub controlling access to a first segment memory bus for transmission of a packet on said first segment memory bus based upon an internal protocol and said second segment arbiter grants a hub controlling access to a second segment memory bus for transmission of a packet on said second segment memory bus based upon an internal protocol.

14. The network according to claim 13, wherein said first segment arbiter grants controlling access for transmission of a single packet and said second segment arbiter grants controlling access for transmission of a single packet.

15. The network according to claim 13, wherein said first segment arbiter grants controlling access to said plurality of hubs based upon requests made by said plurality of hubs and said second segment arbiter grants controlling access to said plurality of hubs based upon requests made by said plurality of hubs.

16. The network according to claim 13, further including a first segment packet buffer and a second segment packet buffer coupled to said segment switch means for permitting said segment switch to selectively associate said plurality of hubs with said first segment packet buffer and said second segment packet buffer.

17. The network according to claim 13, wherein said segment switch associates all of said plurality of hubs with said first segment arbiter.

18. The network according to claim 13, wherein said segment switch associates half of said plurality of hubs with said first segment arbiter and half of said plurality of hubs with said second arbiter.

* * * * *